United States Patent
Oomen et al.

(10) Patent No.: US 11,667,223 B2
(45) Date of Patent: Jun. 6, 2023

(54) COMPLIANT EDGE FRAME BOLSTER FOR SUSPENSION SEATING

(71) Applicant: Illinois Tool Works Inc., Glenview, IL (US)

(72) Inventors: Craig Martin Oomen, Lowell, MI (US); Samuel Smith, Allendale, MI (US); Manfred Mueller, Nuremberg (DE); Michael Long, Sparta, MI (US); Kelly Washburn, Middleville, MI (US); Robert A. Bratty, Stanton, MI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 17/265,464

(22) PCT Filed: Aug. 1, 2019

(86) PCT No.: PCT/US2019/044695
§ 371 (c)(1),
(2) Date: Feb. 2, 2021

(87) PCT Pub. No.: WO2020/028680
PCT Pub. Date: Feb. 6, 2020

(65) Prior Publication Data
US 2021/0291709 A1 Sep. 23, 2021

Related U.S. Application Data
(60) Provisional application No. 62/714,172, filed on Aug. 3, 2018.

(51) Int. Cl.
*B60N 2/70* (2006.01)
*B60N 2/68* (2006.01)

(52) U.S. Cl.
CPC ............ *B60N 2/7011* (2013.01); *B60N 2/686* (2013.01); *B60N 2/7017* (2013.01); *B60N 2/7094* (2013.01)

(58) Field of Classification Search
CPC ..... B60N 2/7011; B60N 2/686; B60N 2/7017
(Continued)

(56) References Cited

U.S. PATENT DOCUMENTS 3,767,261 A * 10/1973 Rowland ................ A47C 7/282
297/452.52
7,222,915 B2 * 5/2007 Philippot ................ B60N 2/70
297/216.13
(Continued)

FOREIGN PATENT DOCUMENTS

CN 101712291 A 5/2010
CN 106004602 A 10/2016
(Continued)

OTHER PUBLICATIONS

International Search Report and Written Opinion for PCT/US2019/044695, dated Nov. 7, 2019 (11 pages).
(Continued)

*Primary Examiner* — David R Dunn
*Assistant Examiner* — Tania Abraham
(74) *Attorney, Agent, or Firm* — Quarles & Brady LLP

(57) ABSTRACT

A vehicle seat includes a support structure, a seat surface (14) and a molded polymeric frame (18). The frame has an edge region and the seat surface (14) is mounted to the frame (18) and the frame is mounted to the support structure. At least a portion of the edge region is flexible.

24 Claims, 10 Drawing Sheets

(58) Field of Classification Search
USPC .................................................. 297/452.56
See application file for complete search history.

(56) References Cited

U.S. PATENT DOCUMENTS

| | | | |
|---|---|---|---|
| 7,594,700 B2 * | 9/2009 | Stumpf | A47C 5/06 297/452.64 |
| 8,329,281 B2 | 12/2012 | Coffield | |
| 8,465,007 B2 | 6/2013 | Coffield et al. | |
| 9,789,790 B2 * | 10/2017 | Kondrad | B60N 2/682 |
| 2001/0028188 A1 | 10/2001 | Stumpf et al. | |
| 2007/0221814 A1 | 9/2007 | Coffield et al. | |
| 2016/0081477 A1 | 3/2016 | Coffield | |
| 2017/0355292 A1 | 12/2017 | Line et al. | |

FOREIGN PATENT DOCUMENTS

| | | |
|---|---|---|
| DE | 60209509 T2 | 10/2006 |
| DE | 102017117353 A1 | 2/2018 |
| JP | 2015107753 A | 6/2015 |

OTHER PUBLICATIONS

Office Action from corresponding German patent application No. 11 2019 003 923.7, dated Aug. 23, 2022 (9 pages).

* cited by examiner

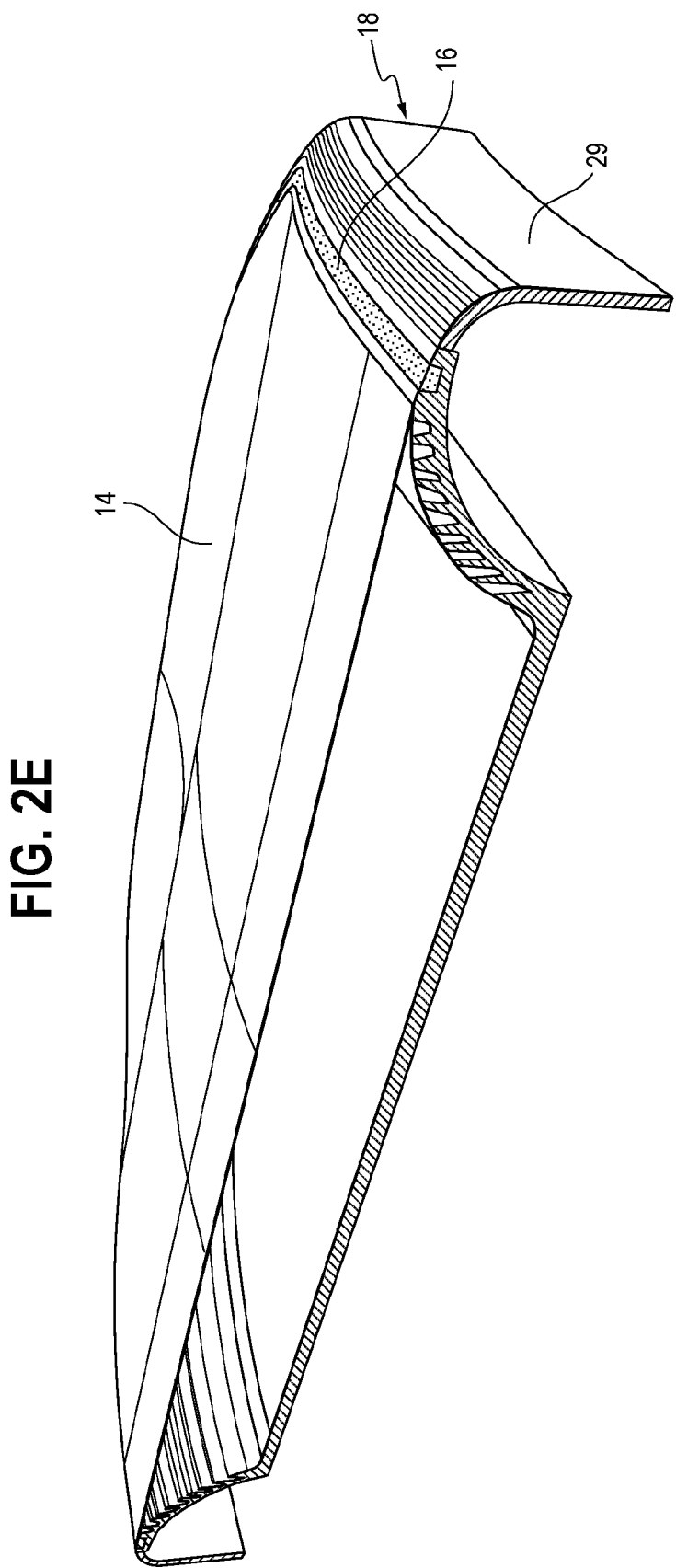

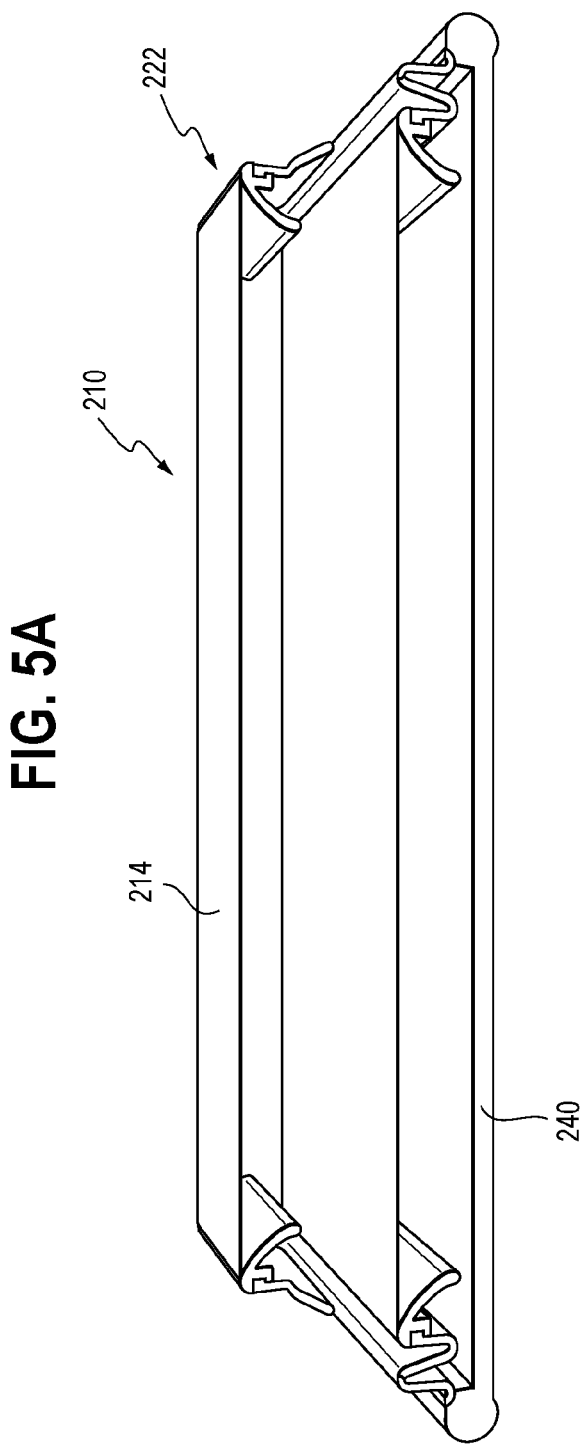

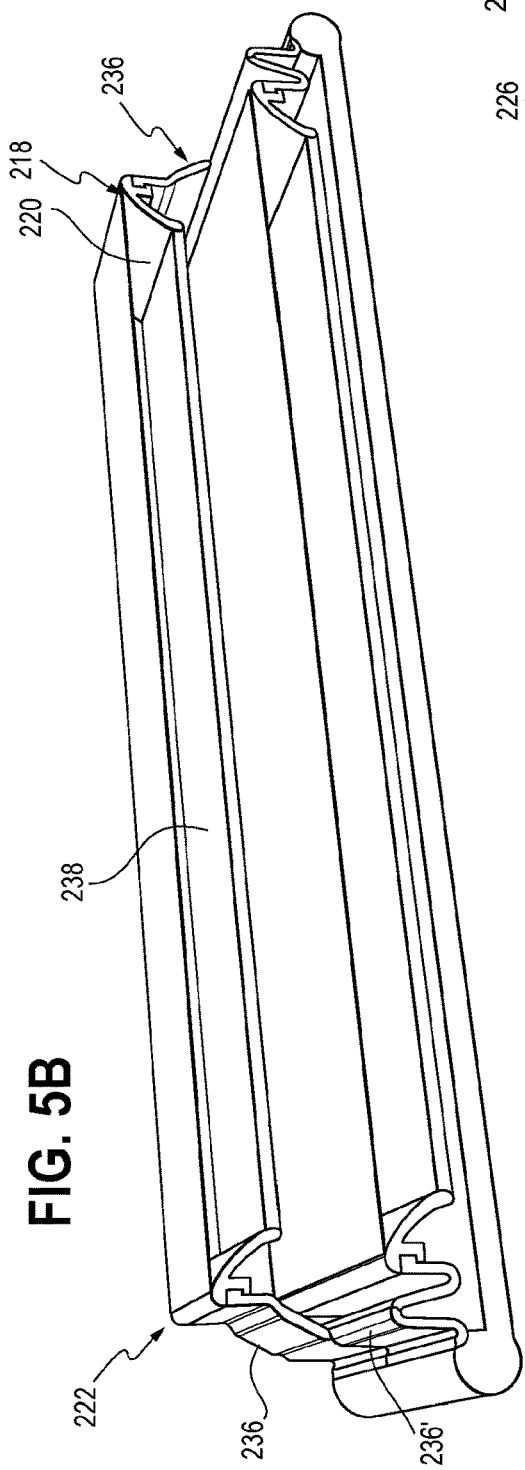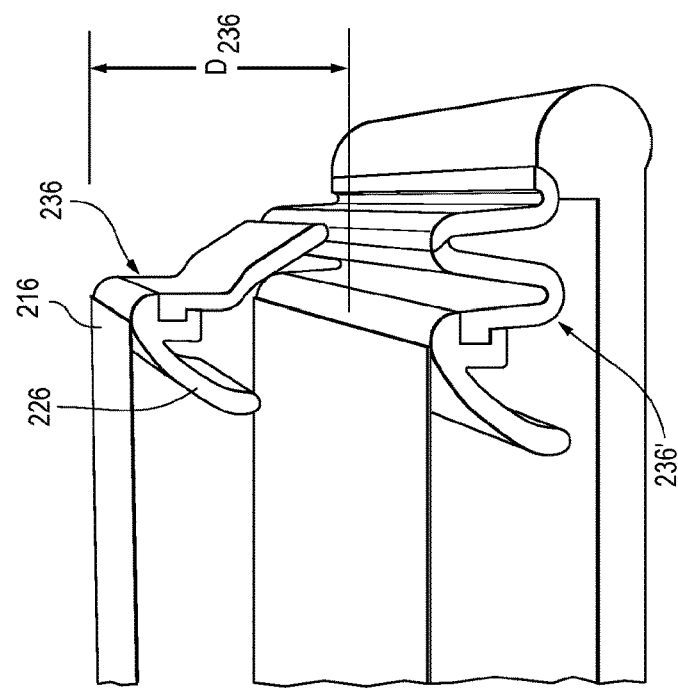

COMPLIANT EDGE FRAME BOLSTER FOR SUSPENSION SEATING

The present application represents the United States National Stage of International Application No. PCT/US2019/044695, filed Aug. 1, 2019, which claims priority to U.S. Provisional Patent Application No. 62/714,172, filed Aug. 3, 2018, the entire contents of which are incorporated by reference in their entirety.

BACKGROUND

The present invention relates to a compliant edge frame for suspension seating, such as a seat bottom surface, seat back surface, head rest and the like.

In the continuing efforts to develop new and improved surfaces for vehicle seating applications, such as seat bottom surfaces, seat back surfaces and seat head rests, there is a focus on obtaining durable, low mass, comfortable and inexpensive load bearing surfaces.

Current vehicle seating that is designed for comfort typical includes a steel structure, usually a C section, and stamped components that are welded together to form a seating structure subassembly. A steel suspension layer that is below the occupant is added to bridge the distance between seat structure beams. The steel suspension offers some hammocking between structure pillars in the seat structure to enhance comfort characteristics.

Foam, such as polyurethane (PE) is used to cover the steel structure and suspension, and offers force vs. deflection compliance during product use for comfort. In a typical configuration, the foam layer is covered with a trim cover that may include leather, vinyl, and/or polyester textile fabric, a lofted fabric breathable layer and felt or a bonded layer to prevent wrinkling. These layers are used generally to manage comfort requirements as well as G-forces during a crash event. Foam, however, has disadvantages in its relatively large space requirements and added weight.

Suspension seating has been gaining popularity in vehicle seating applications. In suspension seating, a fabric surface formed from fibers is secured to a carrier that is mounted to a seat frame and is ultimately mounted to the vehicle structure. The fabric surface can be formed from engineered fibers to tune the surface to a desired comfort level.

One drawback to suspension or fabric seating surfaces is that they are mounted to rigid frames. Such rigid frames may produce hard points around the perimeter of the seating surface and as a result, they may be uncomfortable for the vehicle occupant. As such, one of the driving comfort considerations for such surfaces is to provide comfortable edge frame components while maintaining the frame structure rigid to manage the structural forces in the seating surface. These forces, referred to as hoop stresses, are typically managed through the use of frames formed from metals such as steel or aluminum or from rigid composite materials That is, these structurally rigid members ensure that the tension forces in the surfaces are maintained and do not deteriorate over time. However, as noted above, the rigid members may result in hard points reducing occupant comfort. This is most notable when automotive seats require bolster supports about the seat perimeter. For example, kidney bolsters are located in seat backs and thigh bolster are located on seat bottoms for support during driving. The result is an exaggerated perimeter shape extending above the seating surface about the perimeter that can cause discomfort with ingress and egress from a stationary seat, as found in most automobiles.

Accordingly, there is a need for a rigid suspension frame that offers compliance to the seating assembly edge, that is, a less rigid edge, while maintaining the suspension fabric or molded suspension tension that is needed for comfort and occupant loads. Desirably, such a compliant seating assembly edge can be tuned so that it is compliant in all or selected areas of the seat edge.

SUMMARY

In one aspect a vehicle seat includes a support structure, a seat surface and a molded polymeric frame. The seat surface is mounted to the frame and the frame is mounted to the support structure. The frame has an edge region, at least a portion of which is flexible.

In some embodiments, the frame includes a flange extending inwardly and away from the seat surface. The flange can have an arcuate shape.

In an embodiment, the flange has a series of elongated slits formed in an outer surface thereof. The elongated slits form flexible regions in the flange. The slits can be formed in the flange in a direction generally transverse to the seat surface. That is, the slits are formed into a thickness of the flange and along a length or side of the flange. A fill material can be disposed in the elongated slits to limit an amount of flex of the flange. One suitable fill material is a polymeric material The seat surface can include a carrier on a periphery thereof, and the frame can include a recess for receipt of the carrier.

In an embodiment, the flange has a series of slits formed therein as channels. The channels are formed in an inner surface of the frame. The channels forms flexible regions in the flange and define wafers between the channels.

In embodiments, the fill material or contact of the wafers with adjacent wafers limits flex of the frame. In embodiments, the fill material or contact of the wafers with adjacent wafers limits flex of the frame inwardly, but allows the frame to flex outwardly to maintain the seat surface material in tension while allowing the frame to locally flex to reduce painful hard points if occupant loads are imposed on the frame directly.

In some embodiments, the seat surface is a fabric. The fabric can be a woven fabric formed from fibers, in which some of the fibers are relatively elastic and others of the fibers are relatively non-elastic. In some embodiments, the seat surface is an oriented polymeric membrane, such as an oriented block copolymer, for example, a molded, oriented block copolymer membrane.

In an aspect, the vehicle seat includes a support structure, a seat surface, a molded polymeric frame and a flexible connecting structure connecting the frame to the support structure. The connecting structure can include a flexible, undulating element or membrane movable between an extended position and a home position.

In an embodiment, the element has a double-angled shape in the extended position and rolls to an undulating shape when collapsed into the home position.

A method of making a vehicle seat having a support structure, a seat surface and a molded polymeric frame having an edge region includes forming the frame, with the frame having a plurality of slits therein, flexing the frame to open the slits, filling the slits with a polymeric material and mounting the seat surface to the frame.

The method can include forming the frame with a recess and mounting the seat surface to the frame at the recess. In a method, the seat surface is mounted to a carrier and the carrier is mounted to the frame at the recess. The seat surface can be a woven fabric formed from fibers, in which some of the fibers are relatively elastic and others of the fibers are relatively non-elastic. The method can include molding the carrier to the fabric.

Various embodiments of the seat provide a comfortable seating or resting surface with balanced tension properties and perpendicular loading displacement that limits long term creep over time.

These and other features and advantages of the present device will be apparent from the following description, taken in conjunction with the accompanying sheets of drawings, and in conjunction with the appended claims.

BRIEF DESCRIPTION OF THE DRAWINGS

The benefits and advantages of the present embodiments will become more readily apparent to those of ordinary skill in the relevant art after reviewing the following detailed description and accompanying drawings, wherein:

FIGS. 2A-2F are illustrations of an embodiment of a seat bottom having a compliant edge bolster, in which FIG. 2A is a top view of the seat bottom with a portion of the fabric broken away for illustration purposes, FIG. 2B is a perspective view of the seat bottom; FIG. 2C is a sectional view taken along line 2C-2C of FIG. 2A, FIGS. 2D and 2E are additional sectional views, and FIG. 2F is an enlarged sectional view of one side of the seat bottom frame;

FIGS. 5A-5C illustrate a portion of yet another embodiment of a seat bottom having a rolling compliant edge bolster.

DETAILED DESCRIPTION

Figure 1A:
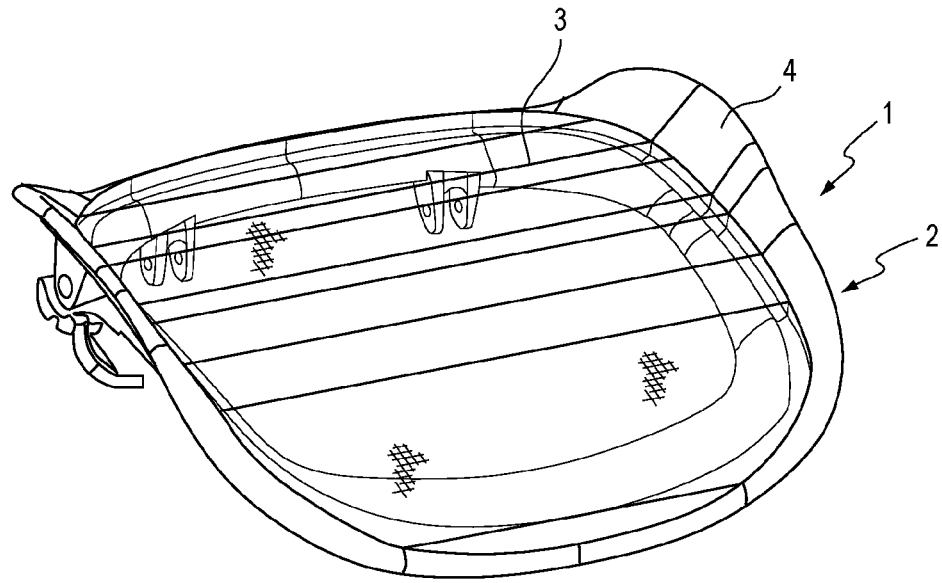
FIGS. 1A and 1B are illustrations of an known suspension seat bottom having a rigid edge bolster.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 1B:
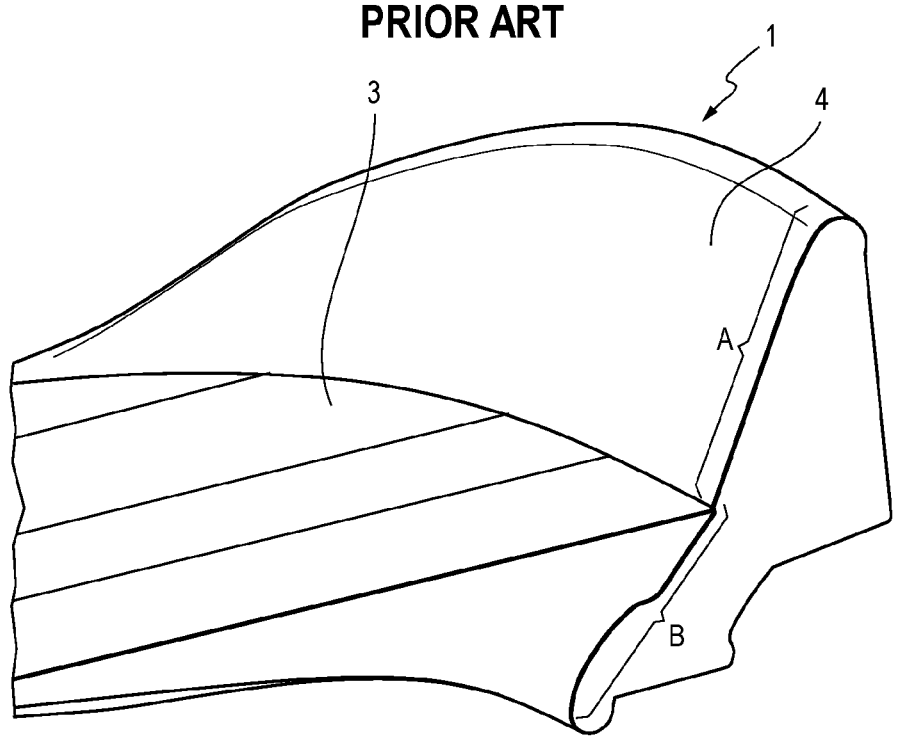
Figure 2A:
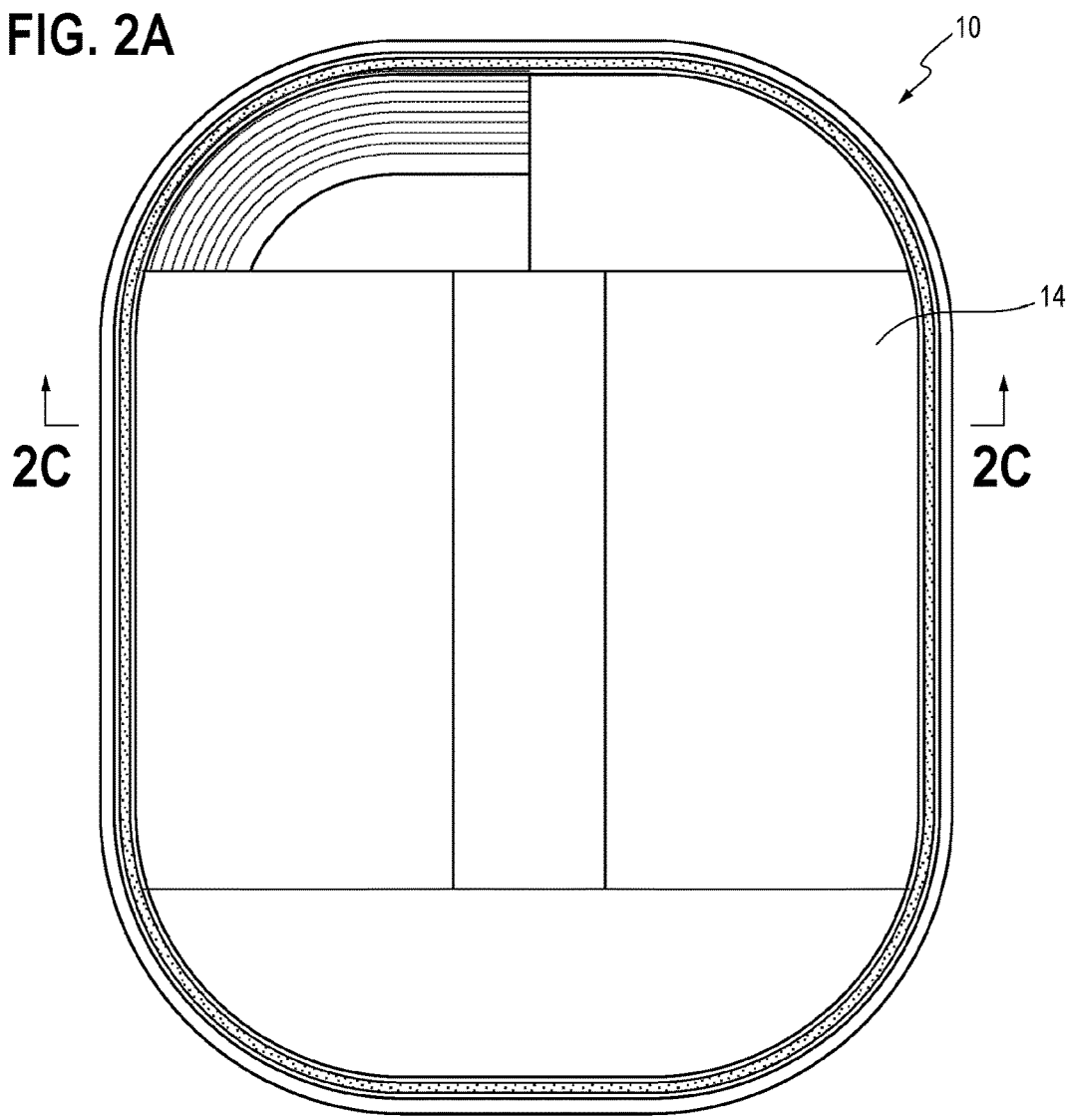
Figure 2B:
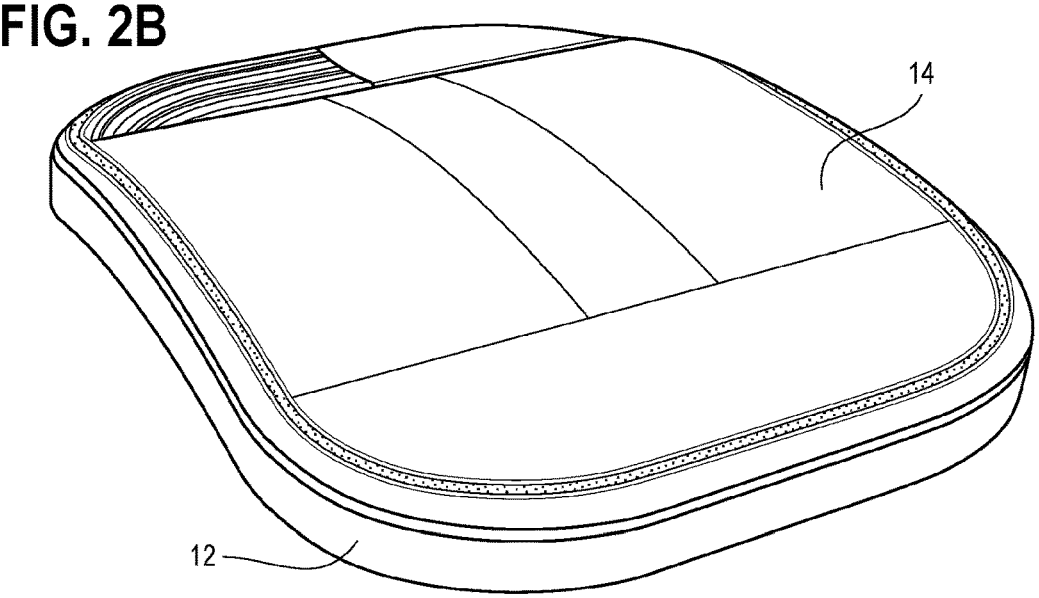
Figure 2C:
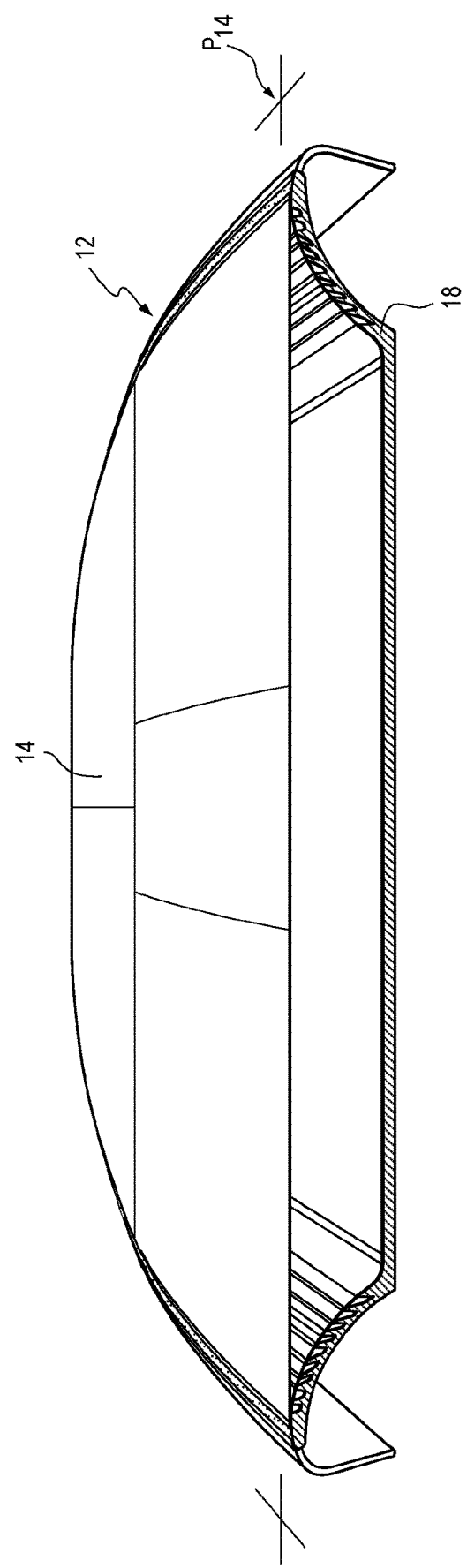
Figure 2D:
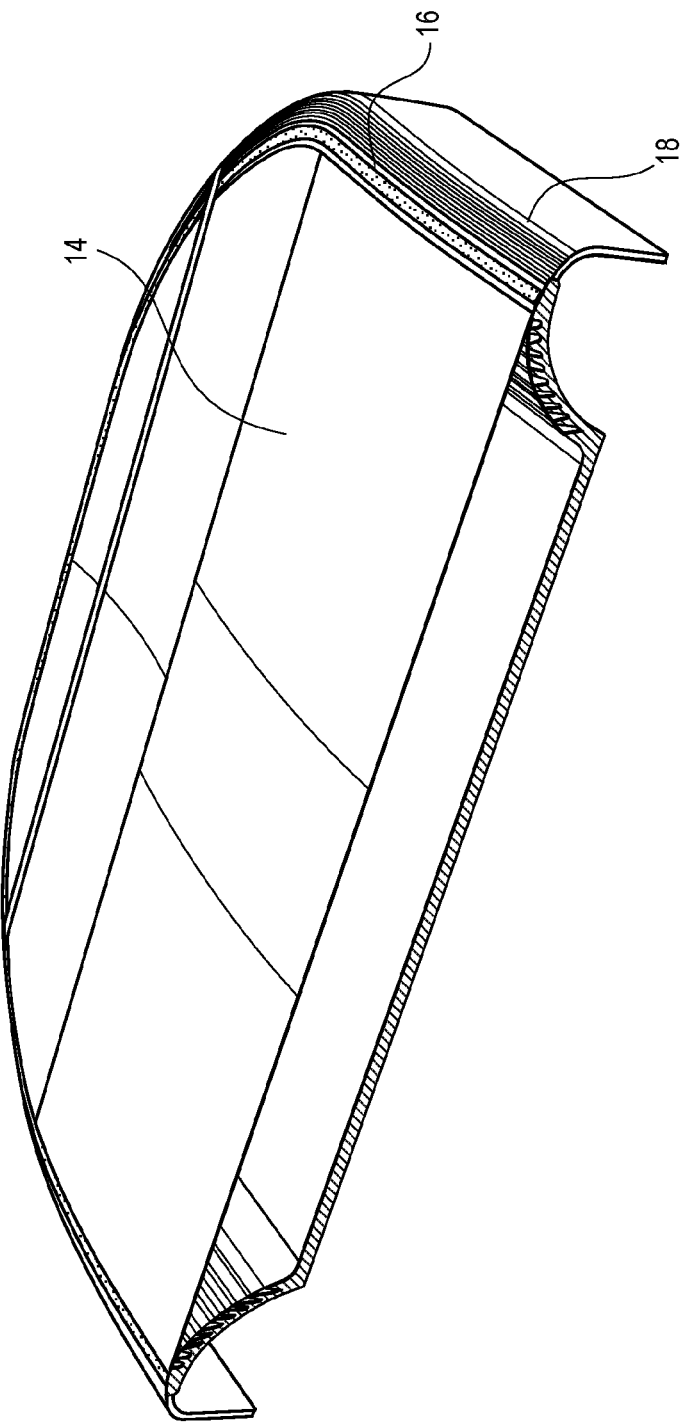
Figure 2F:
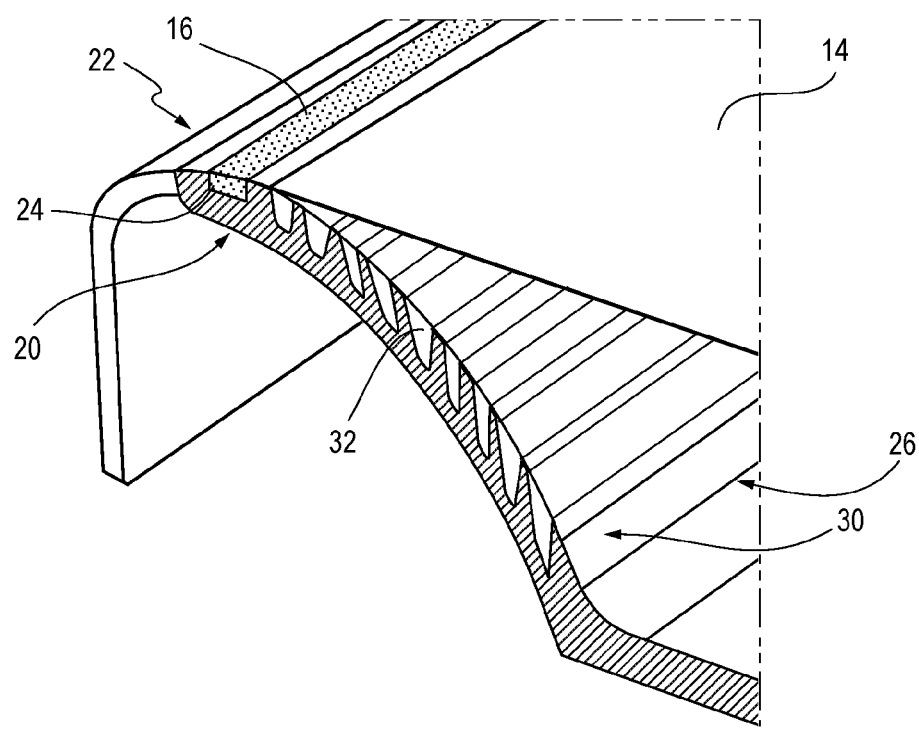

Referring to the figures and in particular to FIGS. 1A and 1B, there is shown a known suspension or fabric seat bottom 1 that includes a frame 2 and a fabric suspension seating surface 3. The frame 2 is exposed and, when occupied, a frame upper portion 4 (the portion above the seating surface 3 as seen in FIG. 1B) may be in contact with the seat occupant. For use in vehicles, such a design or seat configuration can subject the occupant to hard points and, as a result may be uncomfortable and undesirable in crash events.

Referring now to FIGS. 2A-2F, there is shown an embodiment of a seat 10 having a compliant edge bolster 12, the illustrated seat 10 being a seat bottom. It will be understood that the seat 10 can be a seat bottom, as shown, a seat back, a headrest or any other suitable surface and that references to seat include seat bottoms, seat backs, and headrests and other surfaces, all of which are within the scope and spirit of the present disclosure.

It will be appreciated that it is desirable for a seat 10 design to isolate occupants from the rigid frame of a suspension seat assembly for head rests, seat backs and seat bottoms. A compliant/flexible frame design allows the rigid frame to independently move when force is applied to offer a soft compliant component between the occupant and the hard suspension frame.

In an embodiment of a seat 10 having a compliant edge bolster 12, the seat 10 can include a fabric seat or polymeric membrane surface. In one example, a fabric seat surface 14 can be woven from fibers. In a known woven fabric, the fibers include yarns and/or other fibers that extend in the front-to-rear direction of a seat bottom surface or a top-to-bottom direction in a seat back surface or headrest. These fibers are referred to as warp fibers. In some known seat surfaces, the warp fibers are relatively non-elastic, whereas weft fibers, which extend in a side-to-side direction transverse to the warp fibers, are elastic. Warp fibers can be formed from, for example, polyester yarn having a linear elasticity of no more than about 5 percent; weft fibers can be formed from, for example, a block copolymer mono-filament and can have a linear elasticity of about 15-20%. One example of such as seating surface is disclosed in Coffield, U.S. Pat. No. 8,329,281, commonly assigned with the present application, and the disclosure of which is incorporated herein in its entirety.

Other seat surfaces 14 include, for example, an oriented polymeric membrane, such as an oriented block copolymer, for example, a molded, oriented block copolymer membrane, such as that disclosed in Coffield, et al., U.S. Pat. No. 8,465,007, commonly assigned with the present application, and the disclosure of which is incorporated herein in its entirety.

In some known fabric surfaces, the fabric is stretched and overmolded directly into a carrier 16 to secure the fabric to the seat 10 structure. Typically, the carrier 16 is then mounted to a frame 18 that is mounted to the seat 10 structure.

An embodiment of a frame 18 having a compliant edge bolster 12 is configured to flex. In an embodiment, the frame 18 is configured to flex unidirectionally. For example, in the embodiment of the seat bottom illustrated in FIGS. 2A-2F, the seat bottom flexes downward, but not upward. In a similar manner, a seat back and headrest will flex rearwardly, but not forwardly. The flex of the frame 18 downward or rearward increases comfort, while maintaining the tension on the seat surface 14. Such a configuration provides for a rigid suspension frame that offers compliance to the seating assembly edge 12 for occupant comfort, while maintaining the seat surface 14, e.g., the suspension fabric or molded suspension, in sufficient tension for supporting occupant loads.

The frame 18 includes a body 20 having an edge region 22 to which the carrier 16 is mounted. The mount can be, for example, a recess or channel 24 into which the carrier 16 is fitted. In an embodiment, the carrier 16 is fitted into the recess 24 and can be maintained in the recess 24 by mating geometries on the frame 18 and carrier 16, mechanical fasteners, such as screws snap catches, clips and the like, as well as adhered to frame 18 by adhesives, as well as polymer to polymer welding, such as sonic welding, vibration welding, hot plate welding, and any other secure fitting as will be recognized by those skilled in the art. The frame body 20 may be molded of a flexible polymeric material, and may further include an arcuate flange 26 extending inwardly and away from the surface 14 adjacent to the carrier-receiving recess 24. The flange 26 includes a series of elongated slits 28 (see FIG. 3A) formed in an outer surface 30. The slits 28 are formed into a thickness of the flange 26 and extend in a direction generally parallel to the seat surface 14. In this manner, a force exerted on the seat surface 14 (transverse to a plane $P_{14}$ of the surface 14) translates into a force on the frame 18 transverse to the slits 28, thus compressing the slits 28. An outer portion 29 of the body 20 can be formed from a relatively flexible material, such as a thermoplastic elastomer or thermoplastic vulcanizate, having the ability to stretch, to moderate elongations and return to its near original shape and the ability to cycle through such stretching. Although the slits 28 are shown in the outer surface 30 in FIG. 3A, it will be appreciated that the slits 28 may be formed in the inner surface 31 or the slits may be formed in both the outer and inner surfaces 30, 31.

The frame body 20 can be molded from a wide variety of polymeric materials. Contemplated suitable materials for the body 20 include nylon, polybutylene terephthalate (PBT) and the like. In an embodiment, the slits 28 are filled with a fill material 32 that is resilient, but can be less resilient (less flexible) than the frame body 20 at the slits 28. The fill material 32 allows the frame 20 to flex, but limits the amount of flex to control and maintain the seat surface 12 in sufficient tension for supporting occupant loads.

As with the frame body 20 material, a wide variety of materials can be used for the fill material 32. One suitable material is a thermoplastic elastomer, such as HYTREL® commercially available from E. I. du Pont de Nemours and Co. The fill material 32 can be applied to the frame body slits 28 by hand or by machine application. The fill material 32 can also be molded into the frame body slits 28 in a two-step or two-shot molding process. Such processes permit commercial scale production of the seat.

Figure 3A:
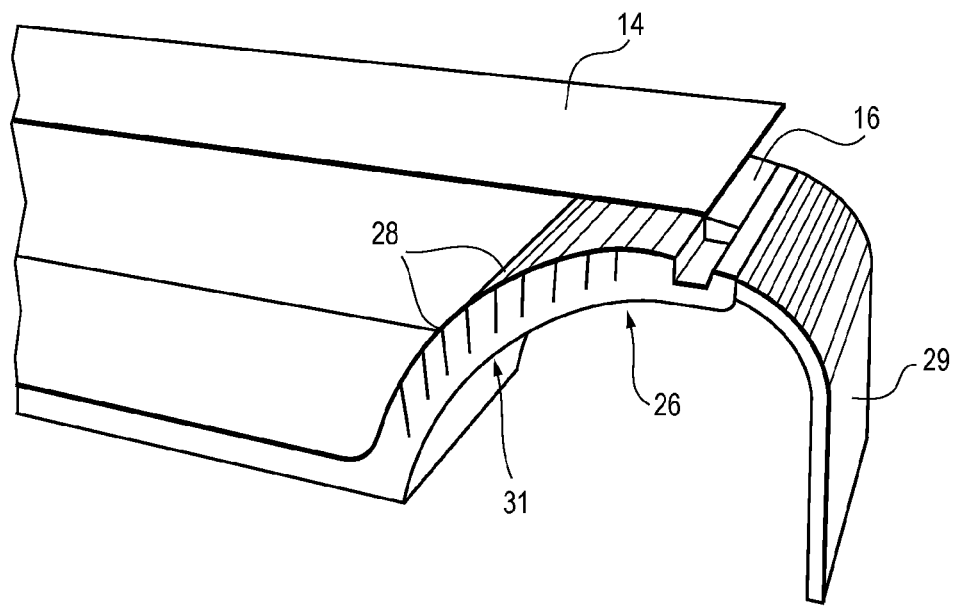
FIGS. 3A and 3B illustrate a method for making the frame of the embodiment shown in FIGS. 2A-2F.
Figure 3B:
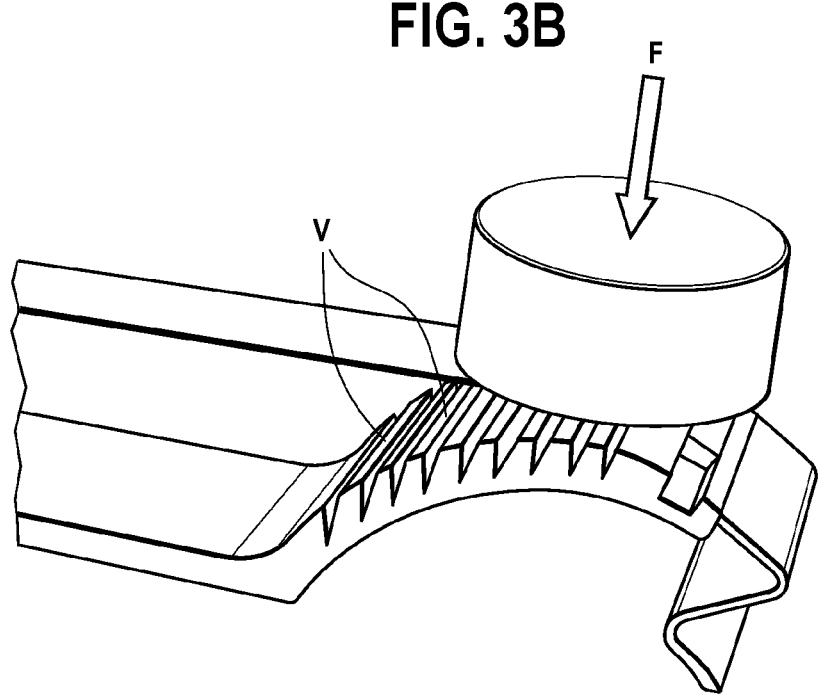

Referring to FIGS. 3A and 3B, in one contemplated process or method of making the frame 18 of FIGS. 2A-2F, the frame 18 is formed in one step of the process. Slits or cuts 28 (referred to herein as slits) can be formed in the frame 18 by molding the slits into the frame, or by a post-molding slitting operation. Once the slits 28 are formed, the frame edge region 22 can be urged or bent outwardly or downwardly, as illustrated in FIG. 3B, to increase the size of the slits 28 to create a void V into which the fill material 32 is applied, and the slits 28 filled, for example, by a second molding operation.

In embodiments, the fill material 32 limits flex of the frame 18 inwardly, but can allow the frame 18 to flex outwardly to maintain the seat surface 14 material in tension while allowing the frame 18 to flex locally to reduce painful hard points if occupant loads are imposed on the frame 18 directly.

The seat surface carrier 16, with the seat surface 14 mounted thereto, can be fitted into the frame recess 24 before, during or after the fill material 32 is applied to the slits 28. In a contemplated method, the carrier 16 is fitted into the frame recess 24 prior to bending the edge regions 22 outwardly to apply a pre-tension to the seat surface 14.

Figure 4A:
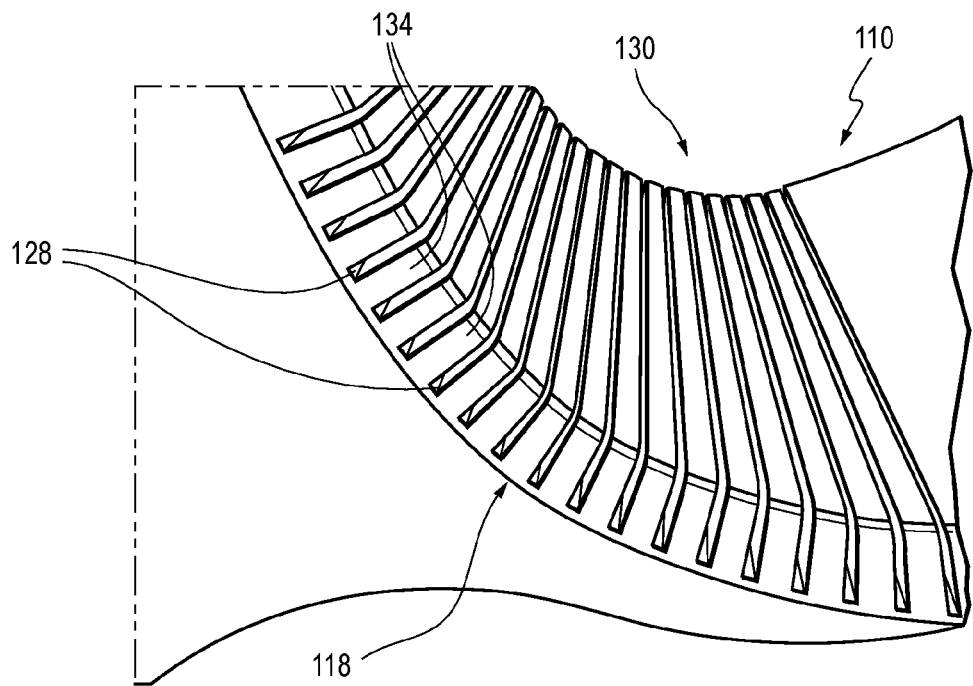
FIGS. 4A and 4B illustrate a portion of an embodiment of a seat bottom having a compliant edge bolster.
Figure 4B:
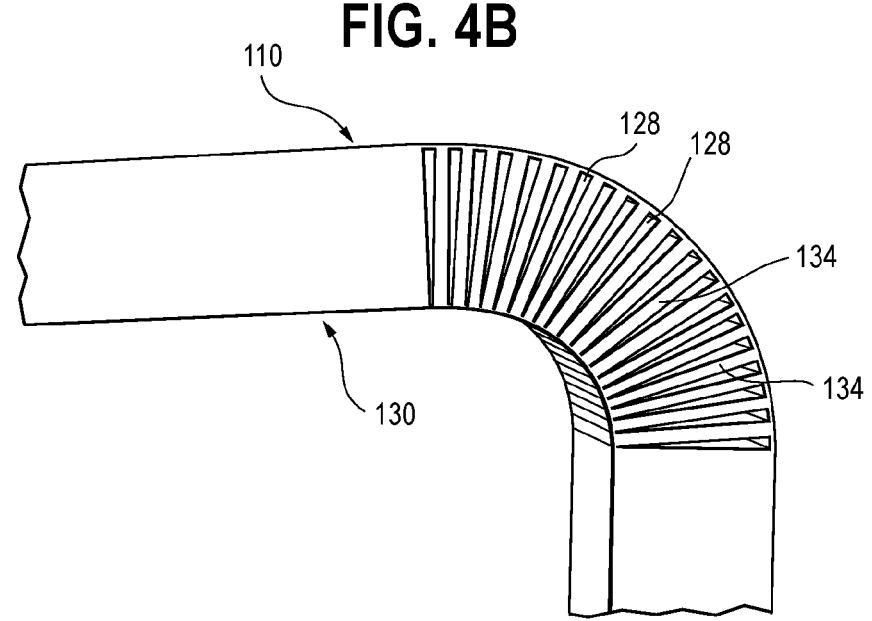

Another embodiment of a frame 118 for a seat having a compliant edge bolster, is illustrated in FIGS. 4A-4B. In this embodiment, the frame body 120 includes a series of channels 128 formed on an inner surface 130 that define a series of wafers 134 such that compression of the frame 118 brings the wafers 134 into contact with adjacent wafers 134. It will be appreciated that contact of the wafers 134 with one another limits the amount of travel and thus overall compression of the frame 118. As such by selecting the wafer 134 thicknesses and the gap (or channel 128) dimensions, the frame 118 can provide compliance to the seating assembly edge 122 for occupant comfort and maintain the seat surface (not shown) in sufficient tension (by limiting travel) for supporting occupant loads. In embodiments, contact of the wafers 134 with adjacent wafers 134 limits flex of the frame 118 inwardly, but can allows the frame 118 to flex outwardly to maintain the seat surface (not shown) material in tension while allowing the frame 118 to flex locally to reduce painful hard points if occupant loads are imposed on the frame 118 directly.

Still another embodiment of the frame 218 having a compliant edge bolster 222 is illustrated in FIGS. 5A-5C. With reference to these figures, it is to be understood that in each of these figures two seat surfaces are shown to illustrate the home or dead stop position and the extended or use position (see, FIG. 5C). That is, each of the figures shows duplicate seat surfaces and connecting elements for illustration purposes only. Elements in both positions are shown with like reference numerals with the elements in the home/dead stop position indicated with a prime (') superscript. It will also be appreciated that although the seat surfaces are shown in two positions, the home and use positions, the seat surface can be configured to take more than two positions.

In this embodiment, the seat 210 includes a frame 218 having a body 220 with an edge region 222 to which the carrier (not shown) is mounted. The mount can be, for example, a recess or channel in the frame 218 into which the carrier 216 is fitted. In an embodiment, the carrier is fitted into the recess and is maintained in the recess by mating geometries on the frame 218 and carrier 216, by mechanical fasteners, such as screws snap catches, clips and the like, as well as adhered to frame 218 by adhesives, as well as polymer to polymer welding, such as sonic welding, vibration welding, hot plate welding, and any other secure fitting as will be recognized by those skilled in the art. The frame body 220 includes arcuate flanges 226 extending inwardly and away from the seat surface 214 adjacent to the carrier-receiving channel. The frame 218 can include a structural element, such as the illustrated panel 238 connecting inner ends of the flanges 226.

The flanges 226 are mounted to a base surface or structural member 240 of the seat 210 by flexible, rolling radii connecting elements 236. In an embodiment, the flexible connecting elements 236 have a bellows-like shape. As such, the seat frame 218 moves relative to the seat structure by flexing or rolling of the flexible connecting elements 236. The flexible connecting elements 236 can take many shapes. In an embodiment, as illustrated in FIGS. 5A-5C, the elements 236 can have a double-angled shape (as indicated at 236) in the extended position and collapse or roll to an undulating shape (as indicated at 236') in the home position. The displacement $D_{236}$ between the extended and home positions offers compliance for the seating assembly edge 212 for occupant comfort. The frame 218 can move vertically, but the frame 218 remains stiff radially around the perimeter of the seat surface 214 to insure the surface 214 remains tight for seat surface comfort and for supporting occupant loads.

This configuration of the compliant edge 212 uses the flexible element hoop stresses of the flexible connecting elements 236 to control the movement of the seat surface 214. The rolling radii of the connecting elements 236 form bellows that have at least the extended and home positions, and as noted above, can be designed for several positions between the home and extended positions. The reaction forces of the rolling radii can be controlled by a number of factors, such as the flexible connecting elements' material durometer, the rolling radii section wave frequency, the rolling radii pitch and the rolling radii wall stock or thickness. One suitable material for the flexible connecting elements is a block copolymer, such as HYTREL® EM400 or EL250.

The rolling radii flexible connecting elements 236 provide a comfort compliant suspension frame edge 212 that offers a spring rate that can be designed into the members 236 to achieve a soft edge in the areas near and adjacent to the suspension frame.

One contemplated method of making the seat 210, is in a two shot molding process in which the frame 218 is first molded and the flexible connecting elements 236 are then molded into position on and relative to the frame 218. The seat surface 214 and carrier can be installed onto the frame 218 prior to or after the flexible connecting elements 236 are molded to the frame 218.

It will be appreciated that a seat design in accordance with the disclosed embodiments isolates occupants from the rigid frame of a suspension seat assembly for head rests, seat backs and seat bottoms. The compliant/flexible frame design allows the rigid frame to independently move when force is applied to offer a soft compliant component between the occupant and the hard suspension frame, while maintaining the seat surface in sufficient tension for supporting occupant loads. The present frame having a compliant edge bolster provides advantages over conventional seating designs that isolate the occupant from hard points by eliminating the use of foams, such as polyurethane foams and the like.

In the present disclosure, the words "a" or "an" are to be taken to include both the singular and the plural. Conversely, any reference to plural items shall, where appropriate, include the singular. It will be appreciated by those skilled in the art that the relative directional terms such as upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

From the foregoing it will be observed that numerous modification and variations can be effectuated without departing from the true spirit and scope of the novel concepts of the present film. It is to be understood that no limitation with respect to the specific embodiments illustrated is intended or should be inferred. The disclosure is intended to cover by the appended claims all such modifications as fall within the scope of the claims.

What is claimed is:

1. A vehicle seat, comprising:
a support structure;
a seat surface; and
a molded polymeric frame, the frame having a flange having a series of slits, each including a greatest length, an edge region having a perimeter and formed at an outer end of the flange, and a compliant edge bolster formed outwardly of the edge region,
wherein the flange extends away from the seat surface,
wherein the seat surface is mounted to the frame,
wherein the frame is mounted to the support structure,
wherein the greatest length of each slit extends parallel to the perimeter,
wherein at least a portion of the edge region is flexible, and
wherein the series of slits is located between the support structure and the compliant edge bolster.

2. The vehicle seat of claim 1, wherein the flange extends inwardly from the seat surface.

3. The vehicle seat of claim 2, wherein the flange has an arcuate shape.

4. The vehicle seat of claim 2, wherein the series of slits are elongated in shape and are formed in an outer surface of the flange, wherein the series of slits form flexible regions in the flange.

5. The vehicle seat of claim 4, wherein the series of slits are formed in the flange in a direction generally transverse to the seat surface.

6. The vehicle seat of claim 4, wherein a fill material is disposed in the series of slits, the fill material limiting an amount of flex of the flange.

7. The vehicle seat of claim 6, wherein the fill material limits the flex of the flange in a direction and allows flex of the flange in an opposite direction.

8. The vehicle seat of claim 7, wherein the fill material limits the amount of flex in compression.

9. The vehicle seat of claim 6, wherein the fill material is a polymeric material.

10. The vehicle seat of claim 1, wherein the seat surface includes a carrier on a periphery thereof and wherein the frame has a recess for receipt of the carrier.

11. The vehicle seat of claim 1, wherein the series of slits are formed on the flange as channels formed in an inner surface thereof, the channels forming flexible regions in the flange and defining a set of wafers between the channels.

12. The vehicle seat of claim 11, wherein contact of one of the set of wafers with an adjacent one of the set of wafers limits flex of the frame.

13. The vehicle seat of claim 12, wherein contact of one of the set of wafers with an adjacent one of the set of wafers limits the flex of the flange in a direction and allows flex of the flange in an opposite direction.

14. The vehicle seat of claim 13, wherein contact of one of the set of wafers with an adjacent one of the set of wafers limits the amount of flex in compression.

15. The vehicle seat of claim 1, wherein the seat surface is a fabric.

16. The vehicle seat of claim 15, wherein the fabric is a woven fabric formed from fibers, and wherein some of the fibers are relatively elastic and others of the fibers are relatively non-elastic.

17. A vehicle seat, comprising:
a support structure;
a seat surface having a perimeter;
a molded polymeric frame having a flange that extends inwardly and away from the seat surface; and
a flexible connecting structure coupling the frame to the support structure, the connecting structure including a flexible, undulating element that is movable between an extended position and a home position,
wherein the flange is within the perimeter,
wherein the seat surface moves closer to the support structure when the undulating element moves from the extended position to the home position, and
wherein the undulating element extends outwardly from the perimeter and away from the seat surface.

18. The vehicle seat of claim 17, wherein the undulating element has a double-angled shape in the extended position and rolls to an undulating shape in the home position.

19. The vehicle seat of claim 17, wherein the seat surface includes a carrier on a periphery thereof and the frame includes a recess for receipt of the carrier.

20. A method of making a vehicle seat having a support structure, a seat surface and a molded polymeric frame having an edge region, comprising:

forming the frame, the frame having a recess, a compliant edge bolster having a first point closest to the recess and a second point farthest from the recess, the frame having a plurality of slits formed therein, flexing the frame to open the plurality of slits;

filling the plurality of slits with a polymeric material; and mounting the seat surface to the recess, wherein the first point moves closer to the second point when flexing the frame, and wherein the recess is located between the plurality of slits and the compliant edge bolster.

21. The method of claim 20, wherein the seat surface is mounted to a carrier.

22. The method of claim 21, wherein the carrier is fitted into the recess to mount the seat surface to the frame.

23. The method of claim 22, wherein the seat surface is a woven fabric formed from fibers, and wherein some of the fibers are relatively elastic and others of the fibers are relatively non-elastic.

24. The method of claim 23, wherein the carrier is molded to the fabric.

\* \* \* \* \*